United States Patent
Hayashi

(10) Patent No.: US 11,926,511 B2
(45) Date of Patent: Mar. 12, 2024

(54) REMOTE OPERATION TERMINAL AND MOBILE CRANE PROVIDED WITH REMOTE OPERATION TERMINAL

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 392 days.

(21) Appl. No.: 17/607,604

(22) PCT Filed: May 22, 2020

(86) PCT No.: PCT/JP2020/020362
§ 371 (c)(1),
(2) Date: Oct. 29, 2021

(87) PCT Pub. No.: WO2020/235681
PCT Pub. Date: Nov. 26, 2020

(65) Prior Publication Data
US 2022/0219948 A1     Jul. 14, 2022

(30) Foreign Application Priority Data
May 22, 2019   (JP) ................. 2019-096383

(51) Int. Cl.
*B66C 13/40*   (2006.01)
*B66C 13/46*   (2006.01)
*G05D 1/00*    (2006.01)

(52) U.S. Cl.
CPC ............. *B66C 13/40* (2013.01); *B66C 13/46* (2013.01); *G05D 1/0016* (2013.01); *G05D 1/0038* (2013.01)

(58) Field of Classification Search
CPC ......... B66C 13/40; B66C 13/46; B66C 13/22; G05D 1/0016; G05D 1/0038
See application file for complete search history.

(56) References Cited

U.S. PATENT DOCUMENTS

| | | | |
|---|---|---|---|
| 6,778,097 B1 * | 8/2004 | Kajita | E02F 9/205 |
| | | | 342/426 |
| 2005/0007553 A1 * | 1/2005 | Romanoff | F16M 11/18 |
| | | | 352/243 |

(Continued)

FOREIGN PATENT DOCUMENTS

JP     2018-095449 A     6/2018

OTHER PUBLICATIONS

Jun. 30, 2020, International Search Report issued for related PCT application No. PCT/JP2020/020362.

(Continued)

*Primary Examiner* — Jason Holloway
*Assistant Examiner* — Madison B Emmett
(74) *Attorney, Agent, or Firm* — Paratus Law Group, PLLC

(57) ABSTRACT

This remote operation terminal is provided with: an image acquisition unit that acquires an image shot by a suspended load camera; a display device that displays the image; an image rotation operation part that rotates the image; a suspended load moving operation part that sets the moving direction of the tip of a boom; and a terminal-side control device that is configured to be communicable with a control device of a crane, wherein when the image rotation operation part is operated during the operation of the suspended load moving operation part, the terminal-side control device rotates the image displayed on the display device in accordance with a rotation amount of the image rotation operation part, and rotates the moving direction of the tip of the boom set through operation of the suspended load moving operation part reversely to the rotating direction of the image displayed on the display device, by an amount of the rotation of the image.

5 Claims, 8 Drawing Sheets

(56) References Cited

U.S. PATENT DOCUMENTS

| | | | | |
|---|---|---|---|---|
| 2015/0035658 A1* | 2/2015 | Provancher | ............ | G05G 9/047 340/407.1 |
| 2015/0249821 A1* | 9/2015 | Tanizumi | ................ | E02F 9/261 348/46 |
| 2017/0016211 A1* | 1/2017 | Arimatsu | ................ | G01S 19/14 |
| 2019/0322496 A1 | 10/2019 | Hayashi | | |
| 2022/0009749 A1* | 1/2022 | Hoffmann | ................ | B66C 23/06 |
| 2022/0234867 A1* | 7/2022 | Hayashi | ................ | B66C 13/46 |

OTHER PUBLICATIONS

Jun. 30, 2020, International Search Opinion issued for related PCT application No. PCT/JP2020/020362.

* cited by examiner (A)

(B)

(A)

(B)

(A)

(B)

REMOTE OPERATION TERMINAL AND MOBILE CRANE PROVIDED WITH REMOTE OPERATION TERMINAL

CROSS REFERENCE TO PRIOR APPLICATION

This application is a National Stage Patent Application of PCT International Patent Application No. PCT/JP2020/020362 (filed on May 22, 2020) under 35 U.S.C. § 371, which claims priority to Japanese Patent Application No. 2019-096383 (filed on May 22, 2019), which are all hereby incorporated by reference in their entirety.

TECHNICAL FIELD

The present invention relates to a remote operation terminal and a mobile crane provided with the remote operation terminal.

BACKGROUND ART

Conventionally, a mobile crane such that actuators of a crane apparatus are remotely operated in the mobile crane and a remote operation terminal that remotely operates the actuators of the crane apparatus have been proposed. In a work using the remote operation terminal, a worker can perform the work while checking the moving state of a load near the load or at a target position of the load away from the operation device of the crane apparatus.

In such a mobile crane, a relative positional relationship between the crane apparatus and the remote operation terminal changes according to a work situation. For this reason, it has been necessary for the worker who operates the crane apparatus with the remote operation terminal to operate an operation part of the remote operation terminal while constantly considering the relative positional relationship with the work apparatus. Accordingly, there is known a remote operation terminal that enables to simply and easily operate the crane apparatus by matching an operation direction of the operation part of the remote operation terminal with an actuating direction of the crane apparatus regardless of the relative positional relationship between the crane apparatus and the remote operation terminal. For example, it is as in Patent Literature 1.

The remote operation terminal described in Patent Literature 1 includes a control unit configured to be communicable with a control device of a work apparatus (crane apparatus) and is for controlling actuation of the remote operation terminal, a display unit that displays a picture, a first operation unit for remotely operating the work apparatus, and a second operation unit for rotationally operating the picture displayed on the display unit. When the picture is rotated according to an input operation of the second operation unit, the control unit rotates a reference coordinate system in the same rotation direction and rotation amount as the rotation direction and rotation amount of the picture. The worker can match the operation direction of the operation part on the remote operation terminal with a moving direction of a load by the work apparatus by matching the picture displayed on the display device with an actually viewed load direction. Thus, an accurate remote operation can be performed by an easy and simple operation.

The remote operation terminal described in Patent Literature 1 rotates the reference coordinate system together with the image displayed on the display device to thereby match the reference coordinate system of the operation part with the coordinate system of the actually viewed work apparatus. Thus, when the relative positional relationship of the remote operation terminal with respect to the work apparatus changes during the operation by the remote operation terminal, there may be a case where the operation direction of the operation part and the moving direction of the work apparatus no longer match with each other.

CITATION LIST

Patent Literature

Patent Literature 1: JP 2018-95449 A

SUMMARY OF THE INVENTION

Problems to be Solved by the Invention

An object of the present invention is to provide a remote operation terminal capable of preventing an erroneous operation and simply and easily performing a remote operation of a mobile crane even when a relative position of the remote operation terminal with respect to a crane apparatus is changed, and a mobile crane including the remote operation terminal.

Solutions to Problems

The problem to be solved by the present invention is as described above, and a solution to solve the problem will be described below.

Specifically a first invention is a remote operation terminal of a mobile crane including a suspended load camera at a tip of a boom, the remote operation terminal including:
  an image acquisition unit that acquires an image captured by the suspended load camera;
  a display unit that displays the image acquired by the image acquisition unit;
  an image rotation operation unit that receives an image rotation operation by an operator and rotates the image displayed on the display unit so as to correspond to the image rotation operation;
  a crane operation unit that receives a crane moving operation by the operator and generates a control signal for remotely operating the mobile crane on the basis of the crane moving operation; and
  a control unit that is configured to be communicable with a control device of the mobile crane and controls each unit of the remote operation terminal,
  in which when the crane moving operation is performed, the control unit associates a coordinate system of a horizontal plane of the image displayed on the display unit with an operation direction of the crane moving operation, and generates the control signal so that the tip of the boom displayed on the display unit horizontally moves in a direction corresponding to the operation direction of the crane moving operation, and
  when the image rotation operation is performed while the crane moving operation is performed, the control unit rotates the image displayed on the display unit by a rotation amount according to an operation amount of the image rotation operation in an operation direction of the image rotation operation, and rotates the coordinate system by the rotation amount in a direction opposite to a rotation direction of the image to correct a moving direction of the tip of the boom determined on the basis of the crane moving operation.

A second invention is such that, in the remote operation terminal described above, when the image rotation operation is performed while the crane moving operation is performed, the control unit corrects the moving direction of the tip of the boom determined by the crane moving operation so as to rotate in a direction opposite to the rotation direction of the image by the rotation amount of the image determined by the image rotation operation.

A third invention is such that, is the remote operation terminal, the control unit causes the moving direction of the tip of the boom to be displayed on the display unit by superimposing on the image.

A fourth invention is such that the remote operation terminal further includes a steering switching unit that switches a function of setting the moving direction of the tip of the boom of either the image rotation operation unit or the crane operation unit between an enabled state and a disabled state.

A fifth invention is a mobile crane including a suspended load camera at a tip of a boom, in which the mobile crane is configured to be communicable with the remote operation terminal described above, and the boom is actuated on the basis of an operation signal received from the remote operation terminal.

EFFECTS OF THE INVENTION

The present invention has the following effects.

In the first invention and the fifth invention, since the movement of the tip of the boom is controlled by rotating the image displayed on the display unit, it is not necessary to match the reference coordinate system of the crane operation unit with the coordinate system of the crane apparatus that is actually seen. Thus, an erroneous operation at a time of remote operation of the mobile crane can be prevented, and the remote operation of the mobile crane can be simply and easily performed.

In the second invention, since the movement of the tip of the boom is controlled by setting the moving direction by the operation of the crane operation unit in addition to the rotation of the image displayed on the display unit, the movement of the tip of the boom is controlled by selectively using the operation unit with which the operation of the mobile crane can be performed easily. Thus, an erroneous operation at a time of remote operation of the mobile crane can be prevented, and the remote operation of the mobile crane can be simply and easily performed.

In the third invention, since the moving direction of the tip of the boom is clearly indicated, the moving direction of the tip of the boom is recognized without being conscious of the operation of the image rotation unit and the operation of the crane operation unit. Thus, an erroneous operation at a time of remote operation of the mobile crane can be prevented, and the remote operation of the mobile crane can be simply and easily performed.

In the fourth invention, an operation mode is selected according to preference of the operation of the operator and the operation situation. Thus, an erroneous operation at a time of remote operation of the mobile crane can be prevented, and the remote operation of the mobile crane can be simply and easily performed.

BRIEF DESCRIPTION OF DRAWINGS

FIG. 5(A) illustrates display content of a display device when a suspended load moving operation part of the remote operation terminal is operated, and FIG. 5(B) illustrates a moving direction of a boom in the crane when the suspended load moving operation part of the remote operation terminal is operated.

FIG. 6(A) illustrates display content of the display device when an image rotation operation part of the remote operation terminal is operated, and FIG. 6(B) illustrates the moving direction of the boom is the crane when the image rotation operation part of the remote operation terminal is operated.

FIG. 7(A) illustrates display content of the display device when the suspended load moving operation part and the image rotation operation part of the remote operation terminal are operated, and FIG. 7(B) illustrates the moving direction of the boom in the crane when the suspended load moving operation part and the image rotation operation part of the remote operation terminal are operated.

DESCRIPTION OF EMBODIMENTS

Hereinafter, a crane 1 that is a mobile crane according to a first embodiment of the present invention will be described with reference to FIGS. 1 and 2. Note that although a rough terrain crane will be described in the present embodiment, the mobile crane may be an all-terrain crane, a truck crane, a truck loader crane, an aerial work platform vehicle, or the like.

Figure 1:
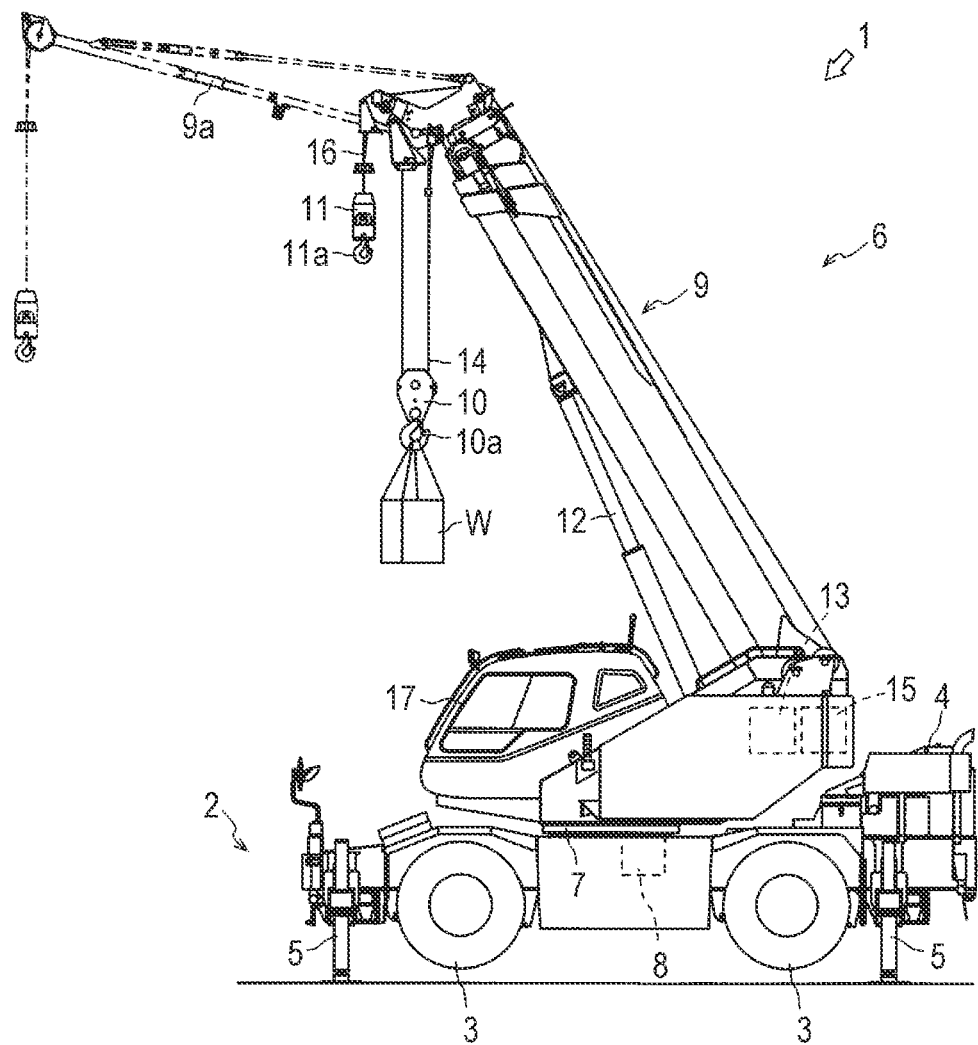
FIG. 1 is a side view illustrating an overall configuration of a crane.

As illustrated in FIG. 1, the crane 1 is a mobile crane that can be moved to an unspecified place. The crane 1 includes a vehicle 2, a crane apparatus 6 that is a work apparatus, a control device 31, and a remote operation terminal 32 (see FIG. 2) capable of remotely operating the crane apparatus 6.

The vehicle 2 is a mobile body that transports the crane apparatus 6. The vehicle 2 has a plurality of wheels 3 and travels using an engine 4 as a power source. The vehicle 2 is provided with outriggers 5. The vehicle 2 can expand the workable range of the crane 1 by extending the outriggers 5 in the width direction of the vehicle 2 and grounding jack cylinders.

The crane apparatus 6 is an apparatus that lifts a load W with a wire rope. The crane apparatus 6 includes a slewing table 7, a boom 9, a jib 9a, a main hook block 10, a sub hook block 11, a raising-lowering hydraulic cylinder 12, a main winch 13, a main wire rope 14, a sub winch 15, a sub wire rope 16, a cabin 17, and the like.

The slewing table 7 is a device that slews the crane apparatus 6. The stewing table 7 is configured to be rotatable about the center of an annular bearing as a rotation center. The slewing table 7 is provided with a hydraulic slewing hydraulic motor 8 that is an actuator. The slewing table 7 is configured to be slewable in one direction and another direction by the slewing hydraulic motor 8.

The slewing hydraulic motor 8, which is an actuator, is rotationally operated by a slewing valve 23 (see FIG. 2), which is an electromagnetic proportional switching valve. The slewing valve 23 can control the flow rate of hydraulic oil supplied to the slewing hydraulic motor 8 to an arbitrary flow rate. The slewing table 7 is provided with a slowing sensor 27 (see FIG. 2) that detects a slewing position (angle) and a slewing speed of the slewing table 7.

The boom 9 is a beam member that supports the wire rope in a state where the load W can be lifted. A base end of a base boom member of the boom 9 is swingably provided substantially at the center of the slewing table 7. The boom 9 is configured to be capable of extending and contracting in the axial direction by moving each boom member by an extension-contraction hydraulic cylinder that is not illustrated and that is an actuator. Further, the boom 9 is provided with a jib 9a.

An extension-contraction hydraulic cylinder that is not illustrated and is an actuator is extended and contracted by an extension-contraction valve 24 (see FIG. 2) that is an electromagnetic proportional switching valve. The boom 9 is provided with an extension-contraction sensor 28 that detects the length of the boom 9, a weight sensor that detects the weight of the load W, and the like.

The suspended load camera 9b (see FIG. 2) is an imaging device that captures an image of the load W and a feature around the load W. The suspended load camera 9b is provided at a tip portion of the boom 9. The suspended load camera 9b is configured to be capable of capturing an image of the load W and a feature and topography around the crane 1 from vertically above the load W.

The main hook block 10 and the sub hook block 11 are members for hanging the load W. The main hook block 10 is provided with a plurality of hook sheaves around which the main wire rope 14 is wound, and a main hook 10a for hanging the load W. The sub hook block 11 is provided with a sub hook 11a for hanging the load W.

The raising-lowering hydraulic cylinder 12 is an actuator that raises and lowers the boom 9 and holds the posture of the boom 9. The raising-lowering hydraulic cylinder 12 is operated to expand and contract by a raising-lowering valve 25 (see FIG. 2) which is an electromagnetic proportional switching valve. The boom 9 is provided with a raising-lowering sensor 29 (see FIG. 2) that detects a raising-lowering angle of the boom 9.

The main winch 13 and the sub winch 15 reel in (wind up) and reel out (wind out) the main wire rope 14 and the sub wire rope 16. The main winch 13 is configured such that a main drum around which the main wire rope 14 is wound is rotated by a main hydraulic motor that is not illustrated and is an actuator, and the sub winch 15 is configured such that a sub drum around which the sub wire rope 16 is wound is rotated by a sub hydraulic motor that is not illustrated and is an actuator.

The main hydraulic motor is rotationally operated by a main valve 26m (see FIG. 2) that is an electromagnetic proportional switching valve. The main winch 13 is configured to be operable at an arbitrary reel in and reel out speed by controlling the main hydraulic motor by the main valve 26m. Similarly, the sub winch 15 is configured to be operable at an arbitrary reel in and reel out speed by controlling the sub hydraulic motor by a sub valve 26s (see FIG. 2) that is an electromagnetic proportional switching valve.

The cabin 17 is mounted on the slewing table 7. An unillustrated cockpit is provided. The cockpit is provided with an operation part for traveling operation of the vehicle 2, a slewing operation part 18 for operating the crane apparatus 6, a raising-lowering operation part 19, an extension-contraction operation part 20, a main drum operation part 21m, a sub drum operation part 21s, and the like (see FIG. 2).

A communication device 22 (see FIG. 2) is a device that receives a control signal from the remote operation terminal 32 via a wide area information communication network or the like, and transmits control information and the like from the crane apparatus 6 via the wide area information communication network or the like. The communication device 22 is provided in the cabin 17. The communication device 22 is configured to transfer a control signal or the like to the control device 31 of the crane 1 when the control signal is received from the remote operation terminal 32. Further, the communication device 22 is configured to transfer control information from the control device 31 and an image G from the suspended load camera 9b to the remote operation terminal 32.

Figure 2:
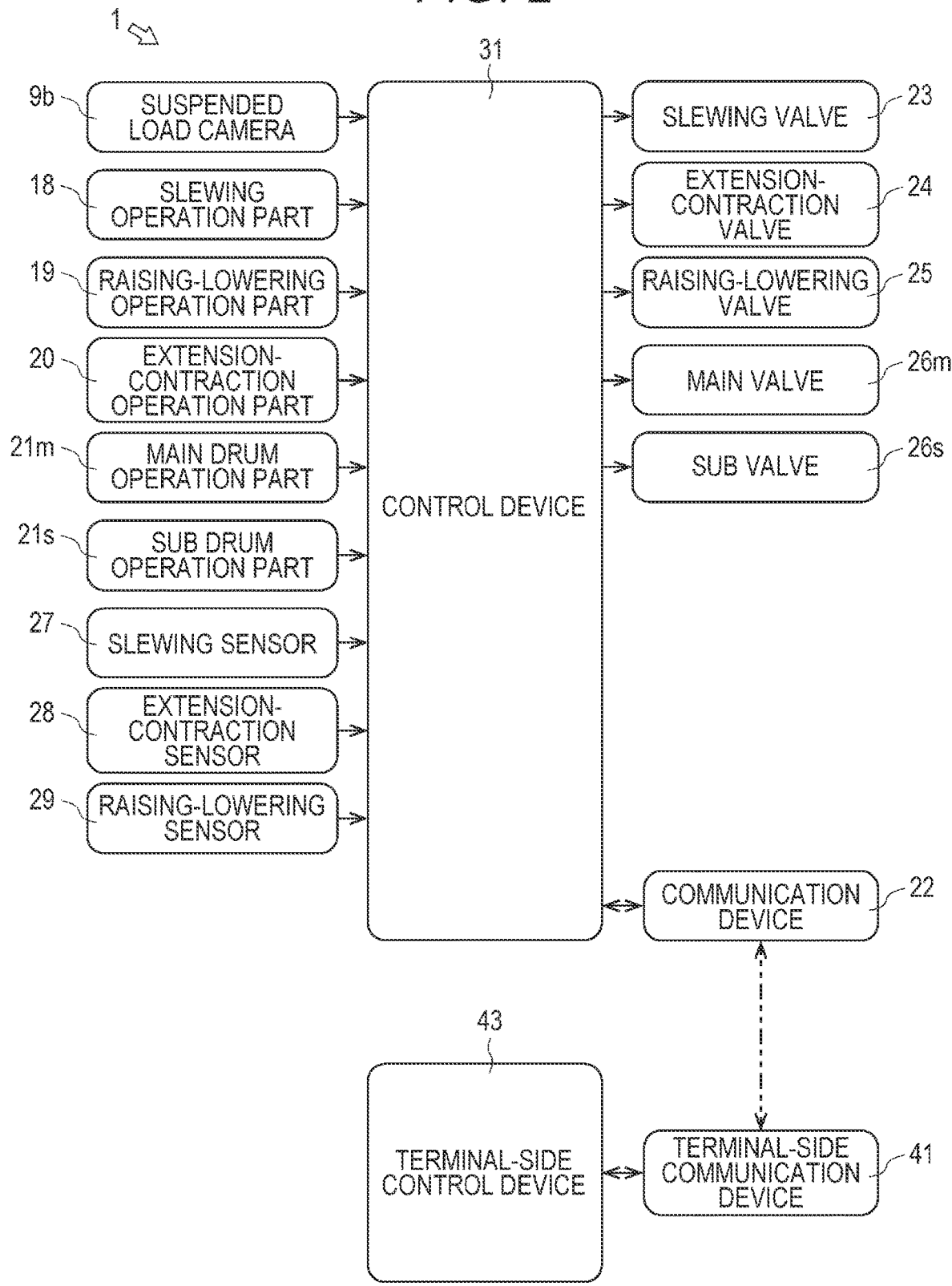
FIG. 2 is a block diagram illustrating a control configuration of the crane.

As illustrated is FIG. 2, the control device 31 is a device that controls actuators of the crane 1 via respective operation valves. The control device 31 is provided in the cabin 17. The control device 31 may substantially have a configuration in which a CPU, a ROM, a RAM, an HDD, and the like are connected by a bus, or have a configuration including a one-chip LSI or the like. The control device 31 stores various programs and data in order to control operation of each actuator, switching valve, sensor, and the like.

The control device 31 is connected to the suspended load camera 9b, the slewing operation part 18, the raising-lowering operation part 19, the extension-contraction operation part 20, the main drum operation part 21m, and the sub drum operation part 21s, and can acquire the image G of the suspended load camera 9b and acquire the operation amount of each of the slewing operation part 18, the raising-lowering operation part 19, the main drum operation part 21m, and the sub drum operation part 21s.

The control device 31 is connected to the communication device 22, and can acquire a control signal from the remote operation terminal 32 and transmit the control information from the crane apparatus 6, the image G from the suspended load camera 9b, and the like.

The control device 31 is connected to the slewing valve 23, the extension-contraction valve 24, the raising-lowering valve 25, the main valve 26m, and the sub valve 26s, and can transmit a control signal to the slewing valve 23, the raising-lowering valve 25, the main valve 26m, and the sub valve 26s.

The control device 31 is connected to the slewing sensor 27, the extension-contraction sensor 28, and the raising-lowering sensor 29, and can acquire posture information such as a slewing position, a boom length, and a raising-lowering angle of the slewing table 7 and the weight of the load W.

The control device 31 generates a control signal corresponding to each operation part on the basis of the operation amount of the slewing operation part 18, the raising-lowering operation part 19, the extension-contraction operation part 20, the main drum operation part 21m, and the sub drum operation part 21s.

The crane 1 configured as described above can move the crane apparatus 6 to an arbitrary position by causing the vehicle 2 to travel. Further, the crane 1 can expand a lifting height and a work radius of the crane apparatus 6 by raising the boom 9 at an arbitrary raising-lowering angle by the raising-lowering hydraulic cylinder 12 by operating the raising-lowering operation part 19, and by extending the boom 9 to an arbitrary boom length by operating the extension-contraction operation part 20. Further, the crane 1 can suspend the load N by the sub drum operation part 21s and the like, and can convey the load N by slewing the slewing table 7 by operating the slewing operation part 18.

Next, the remote operation terminal 32 for remotely operating the crane 1 will be described with reference to FIGS. 3 and 4.

Figure 3:
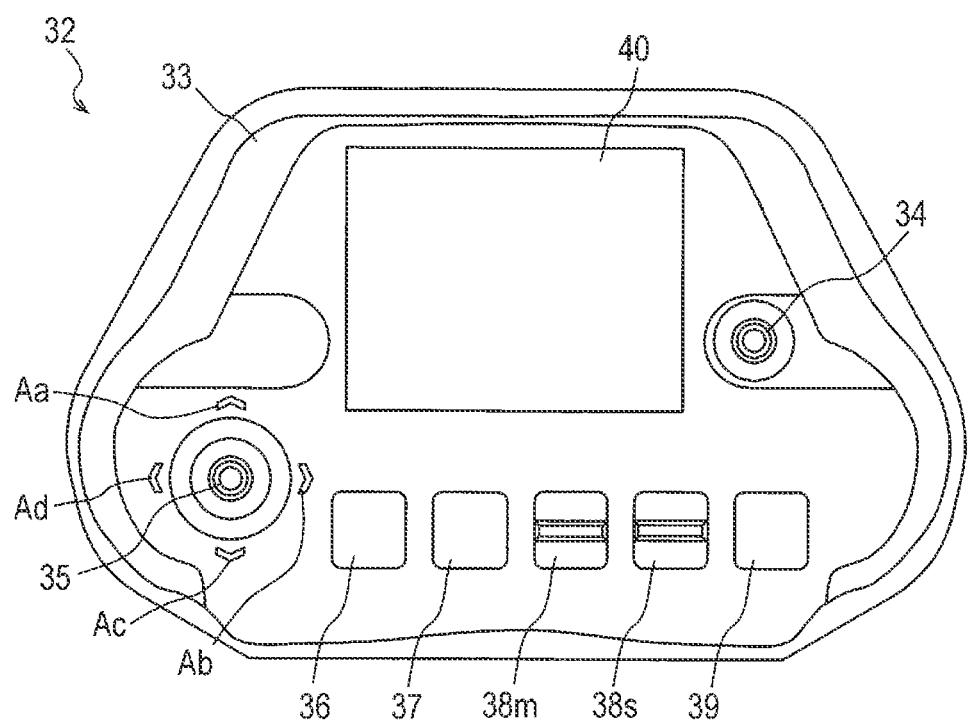
FIG. 3 is a plan view illustrating a schematic configuration of a remote operation terminal according to one embodiment.

As illustrated in FIG. 3, the remote operation terminal 32 is a device used for remotely operating the crane 1. The remote operation terminal 32 includes a housing 33, an image rotation operation part 34 that is an image rotation operation unit provided on an operation surface of the housing 33, a suspended load moving operation part 35 that is a crane operation unit provided on the operation surface of the housing 33, a terminal-side slowing operation part 36, a terminal-side extension-contraction operation part 37, a terminal-side main drum operation part 36m, a terminal-side sub drum operation part 38s, a terminal-side raising-lowering operation part 39, a display device 40 that is a display unit, a terminal-side communication device 41, a terminal-side control device 43 (see FIG. 4), and the like. The remote operation terminal 32 transmits a control signal of an operation valve of each actuator for moving the load W by operating the suspended load moving operation part 35 or various operation parts to the crane apparatus 6 via the wide area information communication network (the Internet or the like).

The housing 33 is a main component of the remote operation terminal 32. The housing 33 has a size that can be held by the operator's hand. The housing 33 is provided with the image rotation operation part 34, the suspended load moving operation part 35, the terminal-side sieving operation part 36, the terminal-side extension-contraction operation part 37, the terminal-side main drum operation part 38m, the terminal-side sub drum operation part 38s, the terminal-side raising-lowering operation part 39, the display device 40, and the terminal-side communication device 41 (see FIGS. 2 and 4) on an operation surface.

The image rotation operation part 34 is an operation part (that is, an operation part that receives an image rotation operation by an operator) to which an instruction (hereinafter, also referred to as "image rotation operation") to change a display direction of the image G displayed on the display device 40 is input. The image rotation operation part 34 includes, for example, a rotatable operation stick projecting from the operation surface of the housing 33 on the right side of the operation surface of the housing 33, and a sensor that is not illustrated and that detects a rotation direction and a rotation amount of the operation stick. The image rotation operation part 34 is configured to transmit a signal for the display direction of the image G displayed on the display device 40 to the terminal-side control device 43 by operating the operation stick. That is, the image rotation operation part 34 is configured to transmit an operation signal regarding the rotation direction and the rotation amount of the image G displayed on the display device 40 to the terminal-side control device 43 by operating the operation stick.

The suspended load moving operation part 35 is an operation part (that is, an operation part that receives a crane moving operation by an operator) to which an instruction (hereinafter, also referred to as "crane moving operation") to move the load W at an arbitrary speed in an arbitrary direction is input. The suspended load moving operation part 35 includes, for example, an operation stick standing substantially vertically from the operation surface of the housing 33 on the left side of the operation surface of the housing 33, and a sensor that is not illustrated and that detects a tilting direction and a tilting amount of the operation stick. The suspended load moving operation part 35 is configured such that the operation stick can be tilted in an arbitrary direction. The suspended load moving operation part 35 is configured to transmit, to the terminal-side control device 43, a signal with respect to the angle between an upward direction of the remote operation terminal 32 and the tilting direction of the operation stick detected by the sensor and the tilting amount thereof. On the remote operation terminal 32, an arrow Aa indicating an upward direction when facing the operation surface of the housing 33, an arrow Ab indicating a rightward direction when facing the operation surface, an arrow Ac indicating a downward direction when facing the operation surface, and an arrow Ad indicating a leftward direction when facing the operation surface are displayed around the suspended load moving operation part 35 as guides of a tilting operation of the suspended load moving operation part 35.

The terminal-side slewing operation part 36 is an operation part to which an instruction to slew the crane apparatus 6 in an arbitrary moving direction at an arbitrary moving speed is input. The terminal-side slewing operation part 36 includes an operation stick standing substantially vertically from the operation surface of the housing 33 and a sensor that is not illustrated and that detects a tilting direction and a tilting amount of the operation stick.

The terminal-side extension-contraction operation part 37 is an operation part to which an instruction to expand and contract the boom 9 at an arbitrary speed is input. The terminal-side main drum operation part 38m (terminal-side sub drum operation part 38s) is an operation part to which an instruction to rotate the main winch 13 at an arbitrary speed in an arbitrary direction is input. The terminal-side raising-lowering operation part 39 is an operation part to which an instruction to raise or lower the boom 9 at an arbitrary speed is input. Each of the operation parts includes an operation stick standing upright from the operation surface of the housing 33 and a sensor that is not illustrated and that detects a tilting direction and a tilting amount of the operation stick.

The display device 40 is a display device 40 that displays various information such as the posture information of the crane 1 and information of the load W. The display device 40 includes a display device such as a liquid crystal screen. The display device 40 is provided on the operation surface of the housing 33. The display device 40 displays the image G from the suspended load camera 9b, a boom arrow Aw indicating the moving direction of the load W, and a mark M indicating the direction of a slewing center of the slewing table 7. Furthermore, an X axis and a Y axis that are coordinate axes of the image G are displayed on the display device 40. Note that in the present embodiment, the display device 40 is provided in the remote operation terminal 32, but may be a monitor separated from the remote operation terminal 32. Further, the display device 40 may be provided inside the cabin 17 of the crane 1.

Figure 4:
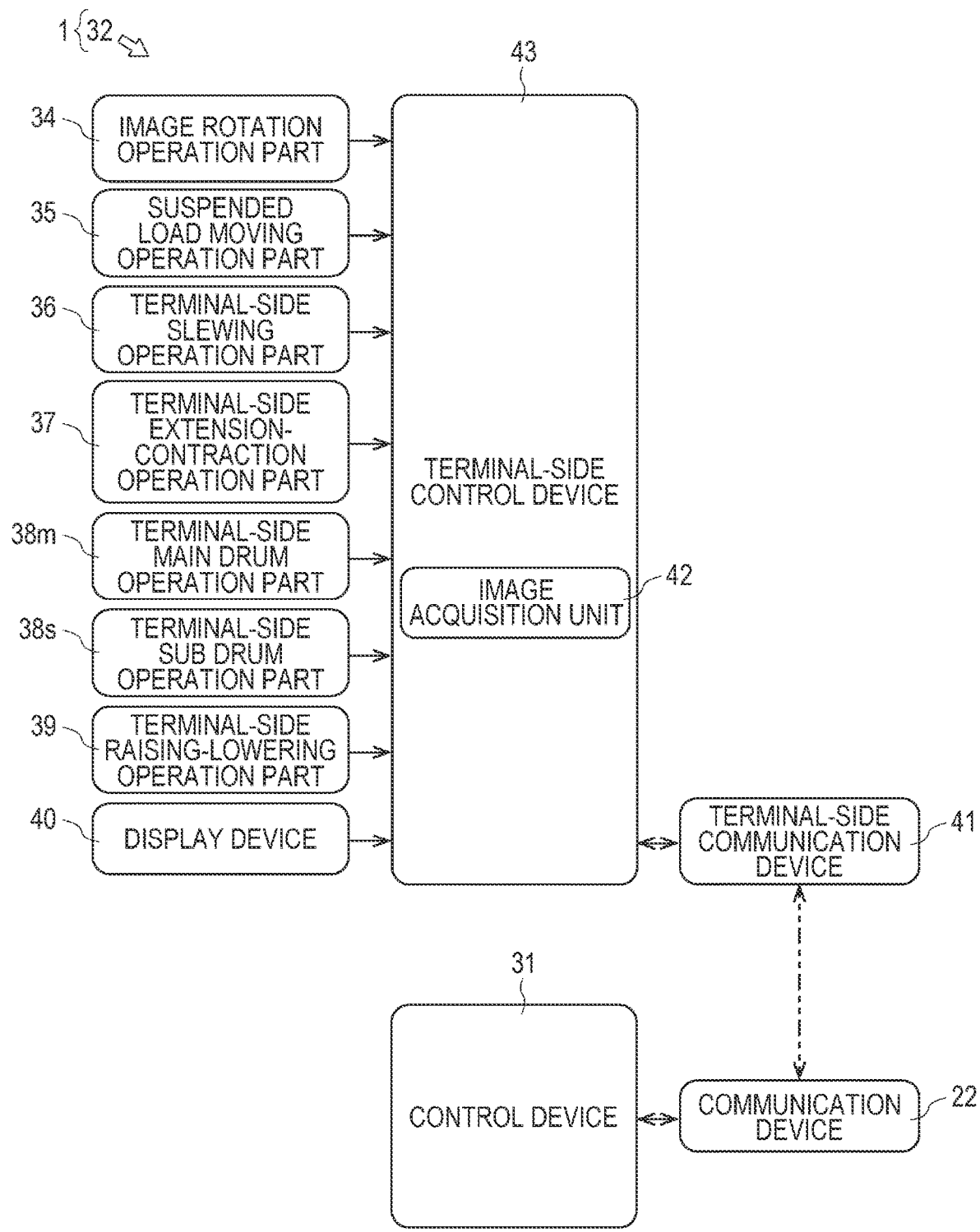
FIG. 4 is a block diagram illustrating a control configuration of the remote operation terminal.
Figure 5:
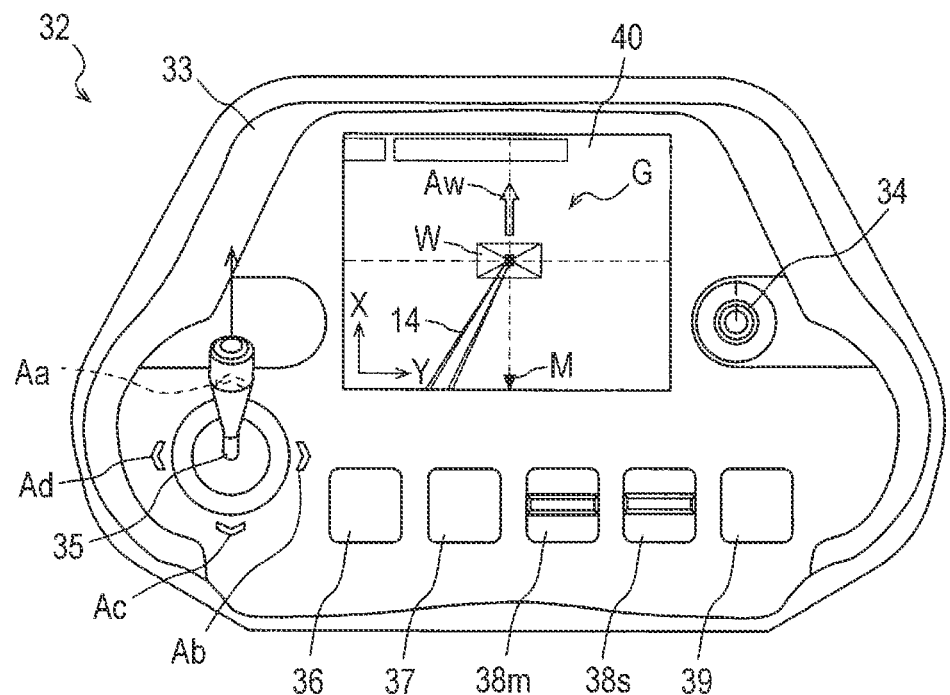
FIGS. 5(A) and 5(B) illustrate the remote operation terminal and the crane operated by the remote operation terminal.
Figure 5:
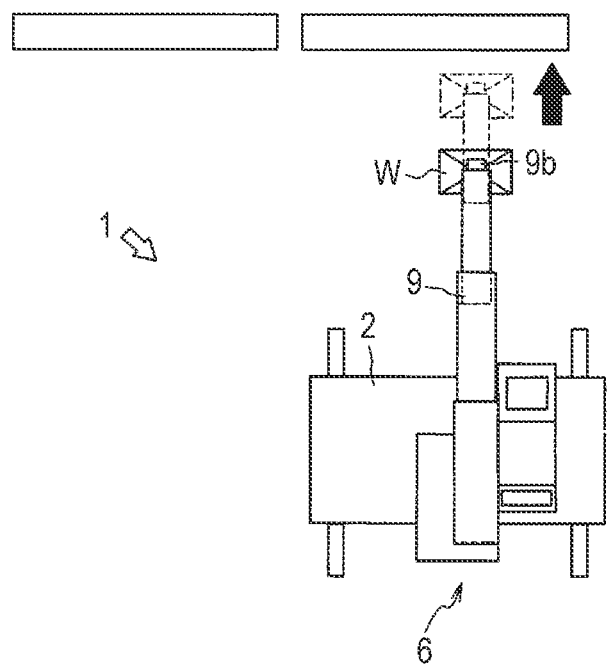
Figure 6:
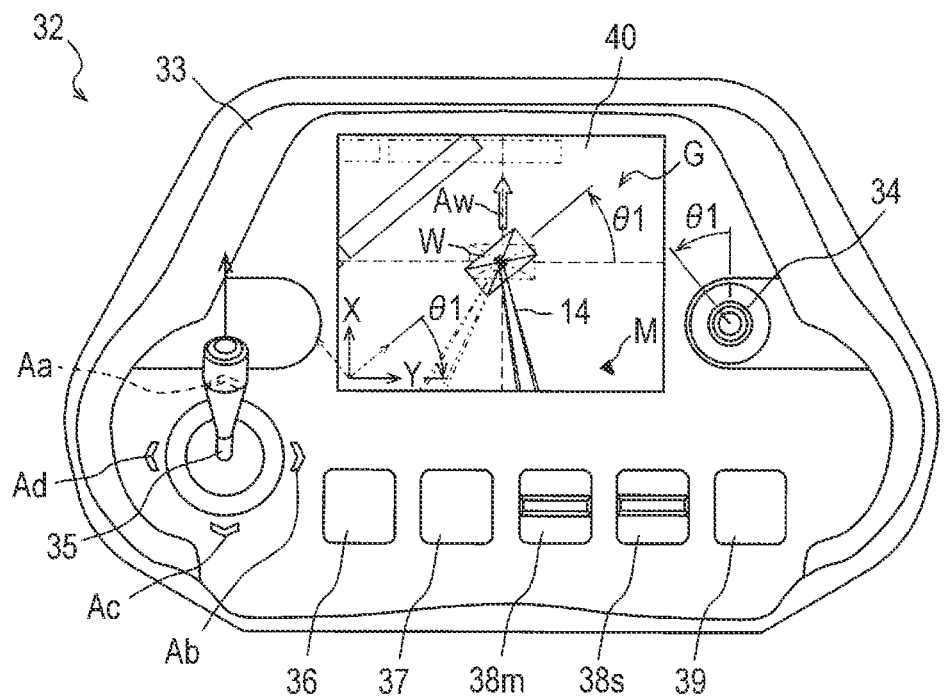
FIGS. 6(A) and 6(B) illustrate the remote operation terminal and the crane operated by the remote operation terminal.
Figure 6:
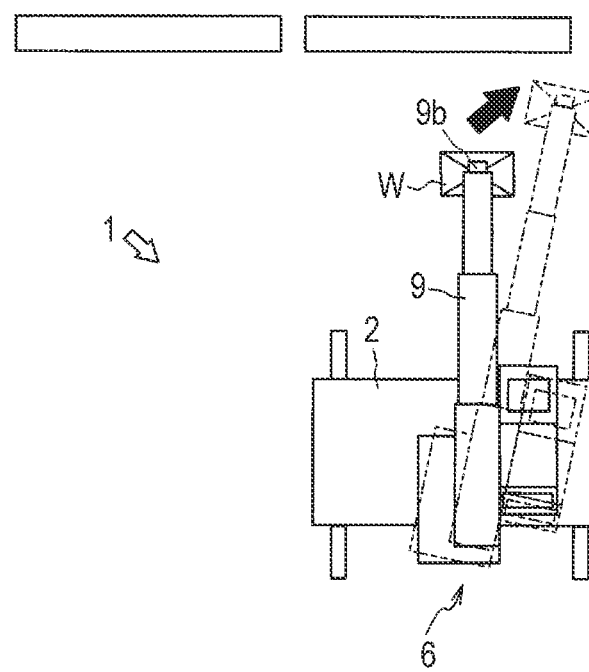
Figure 7:
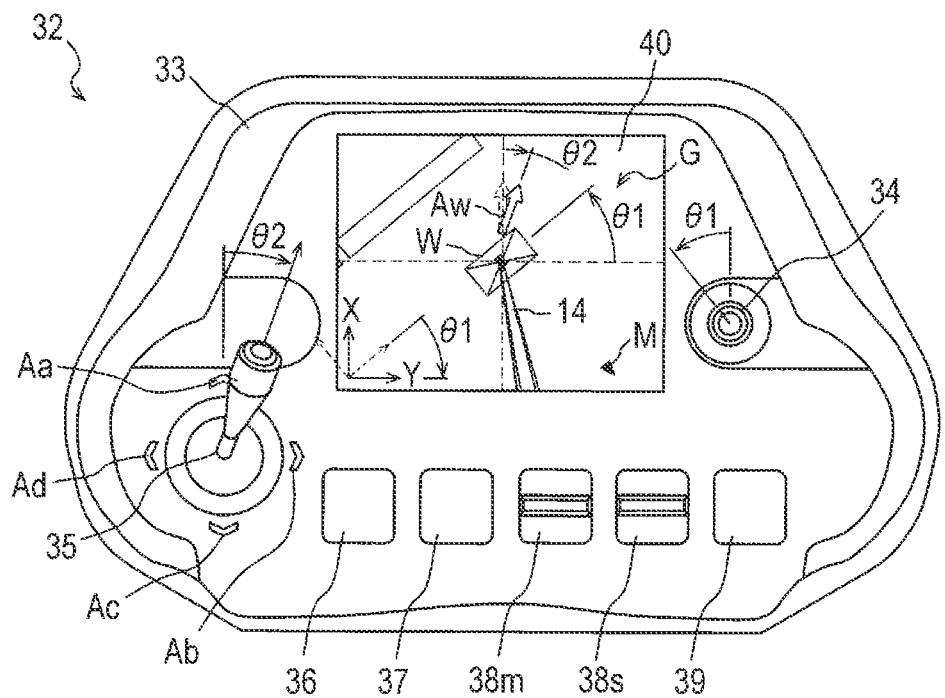
FIGS. 7(A) and 7(B) illustrate the remote operation terminal and the crane operated by the remote operation terminal.
Figure 7:
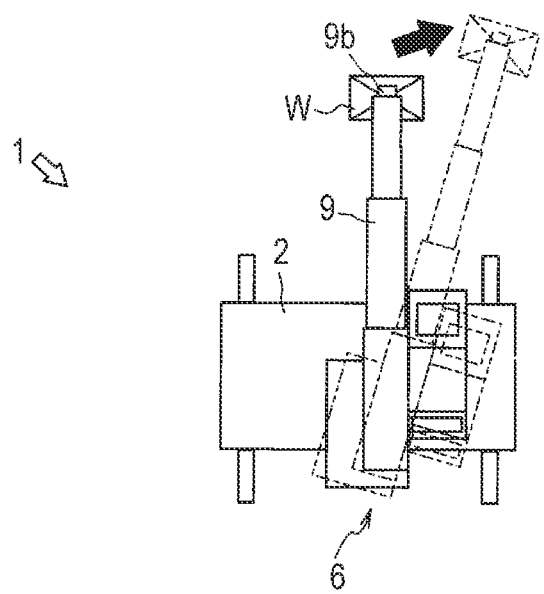

As illustrated in FIG. 4, the terminal-side communication device 41 is a device that receives the control information or the like of the crane apparatus 6 via the wide area information communication network or the like, and transmits the control information or the like from the remote operation terminal 32 to the crane apparatus 6. The terminal-side communication device 41 is provided inside the housing 33. The terminal-side communication device 41 is configured to transmit the image G (see FIGS. 5(A) and 5(B)), the control signal, and the like from the suspended load camera 9b of the crane apparatus 6 to the terminal-side control device 43. Further, the terminal-side communication device 41 is configured to transmit control information from the terminal-side control device 43 to the crane apparatus 6 via the communication device 22 of the crane 1 from the wide area information communication network or the like.

The terminal-side control device 43 that is a control unit is a device that controls the remote operation terminal 32. The terminal-side control device 43 is provided inside the housing 33 of the remote operation terminal 32. The terminal-side control device 43 may substantially have a configuration in which a CPU, a ROM, a RAM, an HDD, and the like are connected by a bus, or may have a configuration including a one-chip LSI or the like. The terminal-side control device 43 includes an image acquisition unit 42 that acquires the image G captured by the suspended load camera 9b and performs rotation processing and the like. The terminal-side control device 43 stores various programs and data for controlling operations of the suspended load moving operation part 35, the image rotation operation part 34, the terminal-side slewing operation part 36, the terminal-side extension-contraction operation part 37, the terminal-side main drum operation part 38m, the terminal-side sub drum operation part 38s, the terminal-side raising-lowering operation part 39, the display device 40, the terminal-side communication device 41, and the like.

The terminal-side control device 43 is connected to the suspended load moving operation part 35, the terminal-side slewing operation part 36, the terminal-side extension-contraction operation part 37, the terminal-side main drum operation part 38m, the terminal-side sub drum operation part 38s, and the terminal-side raising-lowering operation part 39, and can acquire an operation signal including the tilting direction and the tilting amount of the operation stick of each operation part. Further, the terminal-side control device 43 is connected to the image rotation operation part 34, and can acquire an operation signal including the rotation direction and the rotation amount and the tilting direction and the tilting amount input to the image rotation operation part 34.

The terminal-side control device 43 is connected to the terminal-side communication device 41, and can transmit and receive various types of information to and from the control device 31 through the communication device 22 of the crane apparatus 6 connected via the wide area information communication network. Specifically, the terminal-side control device 43 can acquire the posture information of the crane 1, a movable range of the crane 1, and a current position of the tip of the boom 9 from the control device 31. The image acquisition unit 42 of the terminal-side control device 43 can acquire the image G captured by the suspended load camera 9b.

From the operation signals of the respective operation sticks acquired from the respective sensors of the terminal-side slewing operation part 36, the terminal-side extension-contraction operation part 37, the terminal-side main drum operation part 38m, the terminal-side sub drum operation part 38s, and the terminal-side raising-lowering operation part 39, the terminal-side control device 43 can generate control signals of the corresponding slewing valve 23, extension-contraction valve 24, raising-lowering valve 25, main valve 26m, and sub valve 26s.

The terminal-side control device 43 is connected to the display device 40, and can cause the display device 40 to display a schematic picture of the crane 1 in the current posture of the crane 1, the image G from the suspended load camera 9b, and various types of information acquired from the crane 1. Further, the terminal-side control device 43 can cause the image G caused to be displayed on the display device 40 by the image acquisition unit 42 to be displayed in an arbitrary direction in conjunction with the rotation direction and the rotation amount input to the image rotation operation part 34.

The terminal-side control device 43 generates a control signal of the crane 1 when the suspended load moving operation part 35 is tilted with a predetermined direction on the screen of the image G displayed on the display device 40 being an operation reference. Specifically, the terminal-side control device 43 generates control signals of valves of respective actuators so that the tip of the boom 9 moves horizontally at the speed corresponding to the tilting amount in the tilting direction of the suspended load moving operation part 35 (cooperative control). That is, when the operator performs the tilting operation of the suspended load moving operation part 35, the terminal-side control device 43 associates the coordinate system of the horizontal plane of the image displayed on the display device 40 with the operation direction (tilting direction) of the tilting operation of the suspended load moving operation part 35, and generates the control signal of the crane 1 so that the tip of the boom 9 displayed on the display device 40 horizontally moves in the direction corresponding to the operation direction of the tilting operation of the suspended load moving operation part 35.

At this time, the terminal-side control device 43 generates the control signal of the crane 1 when the suspended load moving operation part 35 is tilted with reference to the direction on the screen of the image G rotated by the image rotation operation part 34.

As described above, in the remote operation terminal 32, the image rotation operation part 34 is disposed on one side (for example, the right side) of the operation surface of the housing 33, and the suspended load moving operation part 35 is disposed on the other side (for example, the left side) of the operation surface, so that the operator can simultaneously operate the image rotation operation part 34 and the suspended load moving operation part 35 with both right and left hands. When the image rotation operation part 34 is rotated in an arbitrary rotation direction by an arbitrary rotation amount, the remote operation terminal 32 rotates the image G displayed on the display device 40 in the rotation direction, and generates the control signal in which the moving direction of the tip of the boom 9 moving in the tilting direction of the suspended load moving operation part 35 on the horizontal plane is corrected with the rotation of the image G. That is, the remote operation terminal 32 can control the moving direction of the tip of boom 9 by the rotation operation of the image rotation operation part 34.

Hereinafter, the control of the crane 1 by the remote operation terminal 32 will be specifically described with reference to FIGS. 5(A) to 7(B). It is assumed that the remote operation terminal 32 acquires the posture information of the crane 1, the movable range of the crane 1, and the current position of the tip of the boom 9 of the crane 1 from the control device 31 of the crane 1. Further, in the remote operation terminal 32, the operation reference is set so that the tilting direction of the suspended load moving operation part 35 matches with the moving direction of the tip of the boom 9 in the image G displayed on the display device 40 in a state where the image rotation operation part 34 is at an initial position.

As illustrated in FIG. 5(A), the image G captured by the suspended load camera 9b of the crane apparatus 6 is displayed on the display device 40 of the remote operation terminal 32. When the suspended load moving operation part 35 is tilted in the direction of the arrow Aa, which is the upward direction of the remote operation terminal 32 (see the arrow), the terminal-side control device 43 generates the control signal for the crane 1 so that the tip of the boom 9 moves an X-axis direction, which is the upward direction in the image G displayed on the display device 40. Furthermore, the terminal-side control device 43 superimposes and displays the boom arrow Aw indicating the tilting direction of the suspended load moving operation part 35, which is a moving direction of the boom 9, on the image G. The boom arrow Aw may be displayed by changing a display form such as a length and a width according to the moving speed of the boom 9. The terminal-side control device 43 transmits, by using the wide area information communication network or the like, the generated control signal to the control device 31 (see FIG. 2) of the crane 1. That is, in the remote operation terminal 32, the operator can intuitively perform the remote operation of the mobile crane 1 while visually recognizing only the image G displayed on the display device 40 without being conscious of the relative position of the remote operation terminal 32 with respect to the mobile crane 1.

As illustrated in FIG. 5(B), the control device 31 of the crane 1 that has received the control signal from the remote operation terminal 32 transmits the control signal to the valve of each actuator so that the tip of the boom 9 moves in the X-axis direction of the image G. That is, the control device 31 generates a control signal for extending and tilting the boom 9 so as to separate the load W from the slewing table 7 in a state where the height of the load W of the crane 1 from the ground is maintained. At this time, the control device 31 determines an extension length and a tilting angle of the boom 9 on the basis of a preset height restriction or tilting angle restriction or priori of the boom 9. The crane 1 moves the tip of the boom 9 in accordance with the control signal from the control device 31 (see black arrows).

As illustrated in FIG. 6(A), when the image rotation operation part 34 is rotated counterclockwise by a predetermined angle θ1 in a state where the suspended load moving operation part 35 is tilted in the direction of the arrow Aa of the remote operation terminal 32, the terminal-side control device 43 rotates the image G displayed on the display device 40 counterclockwise by the predetermined angle θ1. At the same time, the terminal-side control device 43 rotates the operation reference in the image G clockwise by the predetermined angle θ1 in the direction opposite to the rotation operation direction of the image rotation operation part 34 (see the X axis and the Y axis). Thus, the terminal-side control device 43 generates a control signal for moving the tip of the boom 9 in the X-axis direction in the image G rotated clockwise by the predetermined angle θ1 from the original direction of the operation reference by the tilting operation of the suspended load moving operation part 35 and the rotation operation of the image rotation operation part 34. That is, the terminal-side control device 43 corrects the control signal so that the tip of the boom 9 moves in a direction opposite to the direction of the rotation operation of the image rotation operation part 34.

Furthermore, the terminal-side control device 43 superimposes and displays the boom arrow Aw on the image G on the basis of the generated control signal so as to point the direction rotated clockwise by the predetermined angle θ1 from the original direction of the operation reference (X-axis direction in the image G before rotation). Then, the terminal-side control device 43 transmits the generated control signal to the control device 31 (see FIG. 2) of the crane 1 by using the wide area information communication network or the like.

As illustrated in FIG. 6(B), the control device 31 of the crane 1 that has received the control signal from the remote operation terminal 32 transmits the control signal to the valve of each actuator so that the tip of the boom 9 moves in the X-axis direction of the image G. That is, the control device 31 generates a control signal for extending or tilting the boom 9 so as to separate the load W from the slewing table 7 in a state where the height of the article W from the ground is maintained, and rotating the slewing table 7 clockwise. At this time, the control device 31 determines the extension length and the tilting angle of the boom 9 on the basis of the preset height restriction or tilting angle restriction or priority of the boom 9. The crane 1 moves the tip of the boom 9 in accordance with the control signal from the control device 31 (see black arrows).

When the terminal-side main drum operation part 38m or the terminal-side sub drum operation part 38s is operated in the vertical direction of the remote operation terminal 32, the terminal-side control device 43 generates a control signal for winding up or down the main wire rope 14 or the sub wire rope 16.

The control device 31 (see FIG. 2) of the crane 1 acquires a control signal from the terminal-side control device 43 (see FIG. 4) of the remote operation terminal 32 using the wide area information communication network or the like. The control device 31 controls each valve of each actuator on the basis of the acquired control signal.

With this configuration, since the remote operation terminal 32 controls the moving direction of the tip of the boom 9 by rotating the image G displayed on the display device 40, it is not necessary to match the reference coordinate system of the suspended load moving operation part 35 with the coordinate system of the crane apparatus 6 that is actually seen. That is, the remote operation terminal 32 corrects the control signal of the boom 9 on the basis of a rotation direction and a rotation angle of the rotation operation of the image rotation operation part 34 while generating the control signal for moving the boom 9 in the direction of the tilting operation of the suspended load moving operation part 35 in the image G. Therefore, since the operator can set the moving direction of the boom 9 only by rotating the image G by the rotation operation of the image rotation operation part 34, the operator does not need to be conscious of the positional relationship between the crane 1 and the remote operation terminal 32. Thus, an erroneous operation at the time of remote operation of the crane 1 can be prevented, and the remote operation of the crane 1 can be simply and easily performed.

As illustrated in FIG. 7(A), when the image rotation operation part 34 is rotated counterclockwise by the predetermined angle θ1 while the suspended load moving operation part 35 is tilted in the direction of the arrow Aa of the remote operation terminal 32, the terminal-side control device 43 generates the control signal for moving the tip of the boom 9 in the X-axis direction rotated clockwise by the predetermined angle θ1 from the original direction of the operation reference toward the image G. In this state, when the suspended load moving operation part 35 is tilted toward the remote operation terminal 32 in a direction rotated clockwise by a predetermined angle θ2, the terminal-side control device 43 generates the control signal for moving the tip of the boom 9 in a direction rotated clockwise by the predetermined angle θ2 from the X-axis direction in the image G. That is, the terminal-side control device 43 corrects the control signal so that the tip of the boom 9 moves in a direction obtained by adding the predetermined angle θ2, which is a tilt angle of the suspended load moving operation part 35, to the predetermined angle θ1 on the basis of the clockwise tilting direction in the further tilting operation of the suspended load moving operation part 35.

Furthermore, the terminal-side control device 43 superimposes and displays the boom arrow Aw on the image G on the basis of the generated control signal so as to point the direction rotated clockwise by the predetermined angle θ2 from the X-axis direction. Then, the terminal-side control device 43 transmits the generated control signal to the control device 31 (see FIG. 2) of the crane 1 by using the wide area information communication network or the like.

As illustrated in FIG. 7(B), the control device 31 of the crane 1 that has received the control signal from the remote operation terminal 32 transmits the control signal to the valve of each actuator so that the tip of the boom 9 moves in the direction of the predetermined angle θ2 clockwise from the X-axis direction of the image G. The crane 1 moves the tip of the boom 9 in accordance with the control signal from the control device 31 (see black arrows).

With this configuration, since the remote operation terminal 32 controls movement of the tip of the boom 9 by the tilting operation of the suspended load moving operation part 35 in addition to the rotation operation of the image rotation operation part 34, movement of the tip of the boom 9 is controlled by the operation part with which the operation of the mobile crane 1 can be performed easily. Therefore, in view of the range of the image G displayed on the display device 40, the operator can properly use control by the tilting operation of the suspended load moving operation part 35 and control by the rotation operation of the image rotation operation part 34, and thus controls the boom 9 while appropriately obtaining information from the image G. Thus, an erroneous operation at the time of remote operation of the crane 1 can be prevented, and the remote operation of the crane 1 can be simply and easily performed.

Furthermore, in the remote operation terminal 32, since the moving direction of the tip of the boom 9 is clearly indicated by the boom arrow Aw on the display device 40, the moving direction of the tip of the boom 9 is recognized without being conscious of the operation of the image rotation operation part 34 and the operation of the suspended load moving operation part 35. Therefore, since the operator can set the moving direction of the tip of the boom 9 using the boom arrow Aw as a clue, the operator does not lose sight of the moving direction of the tip of the boom 9. Thus, an erroneous operation at the time of remote operation of the crane 1 can be prevented, and the remote operation of the crane 1 can be simply and easily performed.

Note that the remote operation terminal 32 may include a steering switching unit that switches the function of setting a moving direction of the boom 9 of either the suspended load moving operation part 35 or the image rotation operation part 34 between an enabled state and a disabled state.

Figure 8:
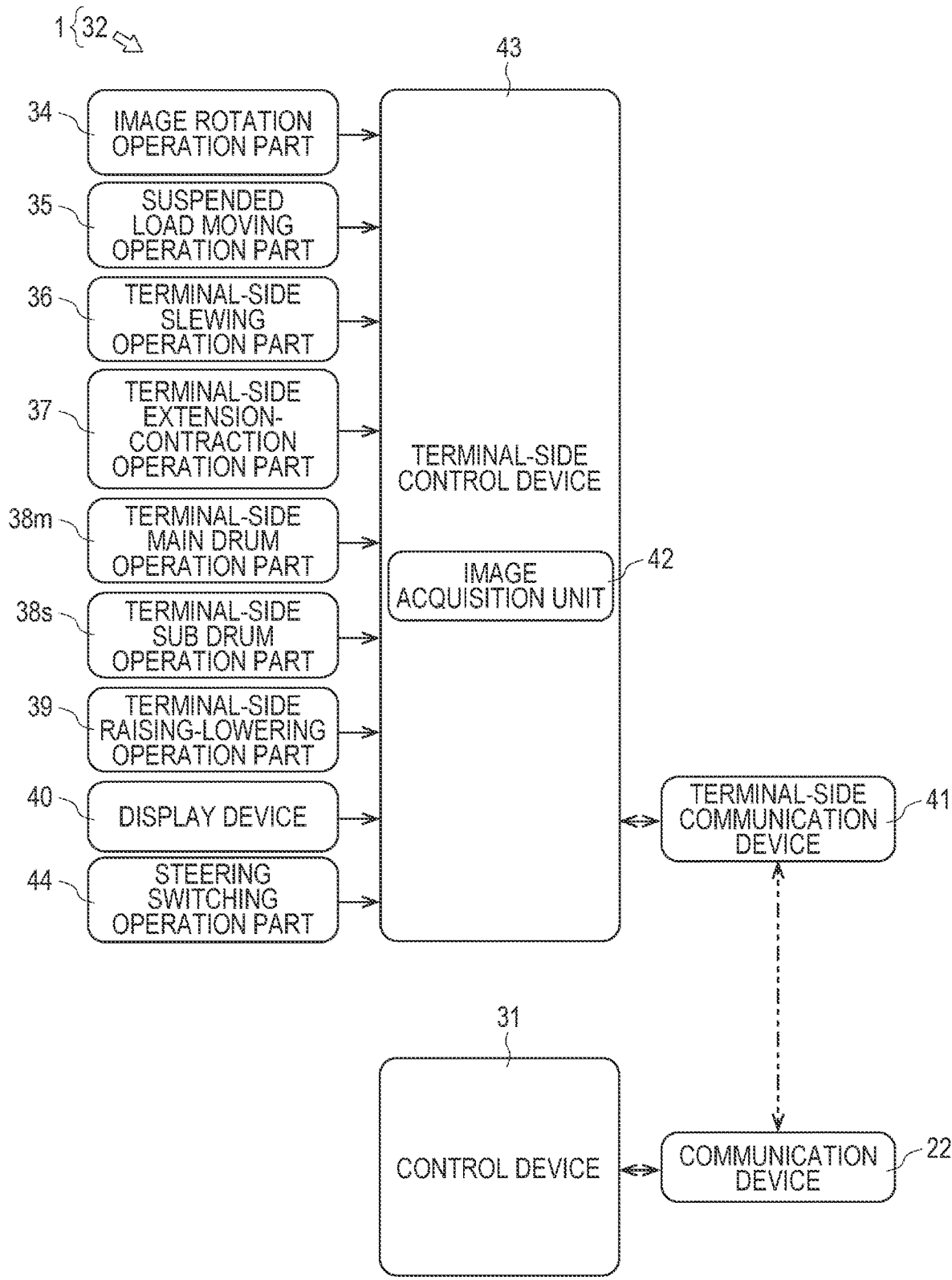
FIG. 8 is a block diagram illustrating a control configuration of a remote operation terminal according to another embodiment.

As illustrated in FIG. 8, the remote operation terminal 32 includes a steering switching operation part 44 which is a steering switching unit. The steering switching operation part 44 includes, for example, switches at three positions. The steering switching operation part 44 can select a state in which both the function of the suspended load moving operation part 35 and the function of the image rotation operation part 34 are not invalidated and a state in which the function of the suspended load moving operation part 35 or the function of the image rotation operation part 34 is invalidated.

When the function of the suspended load moving operation part 35 is disabled, the remote operation terminal 32 sets the moving direction of the tip of the boom 9 only by the rotation operation of the image rotation operation part 34. At this time, the remote operation terminal 32 generates the control signal for moving the tip of the boom 9 at a speed corresponding to the tilting amount in a specific direction (for example, the X-axis direction) in the image G by the tilting operation regardless of the tilting direction of the suspended load moving operation part 35. When the image rotation operation part 34 is operated, the remote operation terminal 32 corrects the control signal of the boom 9 on the basis of the rotation direction and the rotation angle of the rotation operation of the image rotation operation part 34.

When the function of the image rotation operation part 34 is disabled, the remote operation terminal 32 sets the moving direction of the tip of the boom 9 only by the tilting operation of the suspended load moving operation part 35. At this time, the image rotation operation part 34 rotates only the display direction of the image G. That is, the remote operation terminal 32 maintains the relative relationship between the image G and the operation reference of the suspended load moving operation part 35. The remote operation terminal 32 generates the control signal for moving the tip of the boom 9 on the basis of the tilting direction and the tilting amount of the suspended load moving operation part 35. The remote operation terminal 32 does not correct the control signal of the boom 9 even when the image rotation operation part 34 operated.

With this configuration, the remote operation terminal 32 selects an operation mode suitable for preference in operation of the operator operation and the operation status of the crane 1. Thus, an erroneous operation at the time of remote operation of the crane 1 can be prevented, and the remote operation of the crane 1 can be simply and easily performed.

In the present embodiment, the remote operation terminal 32 acquires the image G from the suspended load camera 9b, but is only required to be a device such as a laser scanner that can acquire information of the load W, the ground, and the ground surface. Further, the remote operation terminal 32 sets the moving direction of the tip of the boom 9 by rotating the image G by the image rotation operation part 34, but may also be configured to include a reference change operation part that changes the operation reference of the suspended load moving operation part 35. The remote operation terminal 32 can set the moving direction of the tip of the boom 9 by changing the operation reference of the suspended load moving operation part 35 in a state where the suspended load moving operation part 35 is operated in a certain direction. Further, the remote operation terminal 32 remotely operates the crane 1, but may be configured to remotely operate a work vehicle such as an aerial work platform vehicle.

The above-described embodiments are merely representative forms, and various modifications can be made without departing from the gist of one embodiment. It is a matter of course that the present invention can be implemented in various forms, and the scope of the present invention is indicated by the description of the claims, and further includes equivalent meanings described in the claims and all modifications within the scope.

The entire disclosure of the description, drawings, and abstract included in Japanese Patent Application No. 2019-096383 filed on May 22, 2019 is incorporated herein by reference.

REFERENCE SIGNS LIST 1 crane
6 crane apparatus
9 boom
9b suspended load camera
31 control device
32 remote operation terminal
34 image rotation operation part
35 suspended load moving operation part
40 display device
41 terminal side receiver
42 image acquisition unit
43 terminal-side control device

The invention claimed is:

1. A remote operation terminal of a mobile crane including a suspended load camera at a tip of a boom, the remote operation terminal comprising:
an image acquisition unit that acquires an image captured by the suspended load camera;
a display unit that displays the image acquired by the image acquisition unit;
an image rotation operation unit that receives an image rotation operation by an operator and rotates the image displayed on the display unit so as to correspond to the image rotation operation;
a crane operation unit that receives a crane moving operation by the operator and generates a control signal for remotely operating the mobile crane on the basis of the crane moving operation; and
a control unit that is configured to be communicable with a control device of the mobile crane and controls each unit of the remote operation terminal,
wherein when the crane moving operation is performed, the control unit associates a coordinate system of a horizontal plane of the image displayed on the display unit with an operation direction of the crane moving operation, and generates the control signal so that the tip of the boom displayed on the display unit horizontally moves in a direction corresponding to the operation direction of the crane moving operation, and
when the image rotation operation is performed while the crane moving operation is performed, the control unit rotates the image displayed on the display unit by a rotation amount according to an operation amount of the image rotation operation in an operation direction of the image rotation operation, and rotates the coordinate system by the rotation amount in a direction opposite to a rotation direction of the image to correct a moving direction of the tip of the boom determined on the basis of the crane moving operation.

2. The remote operation terminal according to claim 1, wherein
when the image rotation operation is performed while the crane moving operation is performed, the control unit corrects the moving direction of the tip of the boom determined by the crane moving operation so as to rotate in a direction opposite to the rotation direction of the image by the rotation amount of the image determined by the image rotation operation.

3. The remote operation terminal according to claim 2, further comprising
a steering switching unit that switches a function of setting the moving direction of the tip of the boom of either the image rotation operation unit or the crane operation unit between an enabled state and a disabled state.

4. The remote operation terminal according to claim 1, wherein
the control unit causes the moving direction of the tip of the boom to be displayed on the display unit by superimposing on the image.

5. A mobile crane comprising a suspended load camera at a tip of a boom, wherein
the mobile crane is configured to be communicable with the remote operation terminal according to claim 1, and the boom is actuated on the basis of an operation signal received from the remote operation terminal.

* * * * *